United States Patent
Furumi

(10) Patent No.: US 8,277,050 B2
(45) Date of Patent: Oct. 2, 2012

(54) PROJECTOR AND PROJECTOR CONTROLLING METHOD

(75) Inventor: Yoshiyuki Furumi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 298 days.

(21) Appl. No.: 12/843,385

(22) Filed: Jul. 26, 2010

(65) Prior Publication Data

US 2011/0025987 A1 Feb. 3, 2011

(30) Foreign Application Priority Data

Aug. 3, 2009 (JP) .................................. 2009-180369

(51) Int. Cl.
G03B 21/16 (2006.01)
G03B 21/26 (2006.01)
F21V 29/00 (2006.01)

(52) U.S. Cl. ............. 353/57; 353/52; 353/121; 362/264; 362/294; 362/373

(58) Field of Classification Search .................... 353/52, 353/57, 121; 362/264, 294, 373

See application file for complete search history.

(56) References Cited

U.S. PATENT DOCUMENTS

| 5,136,397 A * | 8/1992 | Miyashita | 348/748 |
| 7,874,685 B2 * | 1/2011 | Miyazawa | 353/122 |
| 2009/0009729 A1 * | 1/2009 | Sakai | 353/57 |

FOREIGN PATENT DOCUMENTS

| CN | 101169575 A | 4/2008 |
| JP | 2005-017583 A | 1/2005 |

* cited by examiner

*Primary Examiner* — Tony Ko
*Assistant Examiner* — Magda Cruz
(74) *Attorney, Agent, or Firm* — AdvantEdge Law Group, LLC

(57) ABSTRACT

A projector includes: an image projection unit which modulates light emitted from a light source and projects the modulated light; a cooling fan which cools the image projection unit; a light source control unit which controls lighting of the light source; a cooling control unit which controls operation of the cooling fan; an input operation unit which receives input operation; and a control unit which allows the light source control unit to decrease the luminance of the light source or allows the cooling control unit to increase the rotational speed of the cooling fan during the period from the time when the input operation unit receives the first ending operation to the time when the input operation unit receives the second ending operation.

6 Claims, 5 Drawing Sheets

PROJECTOR AND PROJECTOR CONTROLLING METHOD

CROSS-REFERENCE

The present application claims priority from Japanese Patent Application No. 2009-180369 filed on Aug. 3, 2009, which is hereby incorporated by reference in its entirety.

BACKGROUND

Most projectors which form images by modulating light emitted from a light source and project the images on a screen or the like include a cooling device (such as a cooling fan) for cooling the interior of a housing heated to higher temperature by lighting of the light source or for other reasons. This cooling device continues cooling for a certain period after the light source is turned off to prevent deteriorations of respective components of the projector which may be caused when the interior of the housing is kept at high temperature (see Japanese Patent Publication No. 2005-17583). The cooling still continued after the light source is turned off is called "cool down", for example.

In recent years, such a projector which can eliminate the necessity for carrying out cool-down or shorten the period required for cool-down by improving durability (heat resistance) of the respective components of the projector, for example, has been attracting attention. According to this projector, commercial power supply can be cut off immediately after the use of the projector, allowing the projector to be promptly put away. In this case, usability of the projector for a user improves.

According to the projector which eliminates the process of cool-down or shortens the period of cool-down, however, there is a possibility that a part of the housing heated to high temperature during use still remains at relatively high temperature after the use. In this case, the user may feel uncomfortable when the user accidentally touches the heated housing.

SUMMARY

Various embodiments may solve at least a part of the problems described above, and the invention can be implemented as the following embodiments or application examples.

Application Example 1

According to at least one embodiment of the disclosure, there is provided a projector including: an image projection unit which modulates light emitted from a light source and projects the modulated light; a cooling fan which cools the image projection unit; a light source control unit which controls lighting of the light source; a cooling control unit which controls operation of the cooling fan; an input operation unit which receives input operation; and a control unit which allows the light source control unit to turn off the light source and allows the cooling control unit to stop rotation of the cooling fan in case that the input operation unit receives a first ending operation to stop projection and a second ending operation performed subsequently to the first ending operation. The control unit performs allowing the light source control unit to decrease the luminance of the light source or allowing the cooling control unit to increase the rotational speed of the cooling fan during the period from the time when the input operation unit receives the first ending operation to the time when the input operation unit receives the second ending operation.

According to this projector, at least decreasing the luminance of the light source or increasing the rotational speed of the cooling fan is performed during the period from reception of the first ending operation to reception of the second ending operation. In this case, the temperature of the projector lowers as the second ending operation is delayed longer. Thus, a user who desires to cool the projector sufficiently may perform the second ending operation after elapse of a time from the first ending operation. On the other hand, a user who desires to put away the projector promptly may perform the second ending operation immediately after the first ending operation. Accordingly, the cooling period can be established in accordance with the convenience or other conditions of the user for ending the use of the projector, which improves the usability of the projector.

Application Example 2

The projector of the above application example, wherein the projector further includes a guide unit which shows guidance for performing the second ending operation after the input operation unit receives the first ending operation.

According to this projector, the guide unit shows guidance for performing the second ending operation after the end of the first ending operation. Thus, even a user not familiar with the operation method can easily carry out the operation for ending the projector.

Application Example 3

The projector of the above application example, wherein the control unit restores the luminance of the light source and the rotational speed of the cooling fan to the conditions prior to the reception of the first ending operation in case that the input operation unit receives predetermined operation different from the second ending operation after reception of the first ending operation.

According to this projector, the luminance of the light source and the rotational speed of the cooling fan return to the original conditions when the predetermined operation different from the second ending operation is performed after the end of the first ending operation. Thus, even when the first ending operation is accidentally performed, this operation can be easily canceled.

Application Example 4

According to at least one embodiment of the disclosure, there is provided a method for controlling a projector which includes an image projection unit modulating light emitted from a light source and projecting the modulated light, a cooling fan cooling the image projection unit, and an input operation unit receiving input operation including the steps of: a first operation step which allows the input operation unit to receive a first ending operation to stop projection; a second operation step which allows the input operation unit to receive a second ending operation performed subsequently to the first ending operation; an ending step for turning off the light source and stopping rotation of the cooling fan after the second operation step; and a cooling step for performing decreasing the luminance of the light source or increasing the rotational speed of the cooling fan during the period after the end of the first operation step and before the start of the second operation step.

According to this method for controlling the projector, at least decreasing the luminance of the light source or increasing the rotational speed of the cooling fan is performed during the period from reception of the first ending operation to reception of the second ending operation. In this case, the temperature of the projector lowers as the second ending operation is delayed longer. Thus, a user who desires to cool the projector sufficiently may perform the second ending operation after elapse of a time from the first ending operation. On the other hand, a user who desires to put away the projector promptly may perform the second ending operation immediately after the first ending operation. Accordingly, the cooling period can be established in accordance with the convenience or other conditions of the user for ending the use of the projector, which improves the usability of the projector.

Application Example 5

The method for controlling the projector of the above application example, wherein the method further includes a guiding step for showing guidance for performing the second ending operation after the end of the first operation step.

According to this method for controlling the projector, the guiding step for showing guidance for performing the second ending operation is executed after the end of the first ending operation. Thus, even a user not familiar with the operation method can easily carry out the operation for ending the projector.

Application Example 6

The method for controlling the projector of the above application example, wherein the method further includes: a canceling step for receiving predetermined operation different from the second ending operation after the end of the first operation step; and a restoring step for restoring the luminance of the light source and the rotational speed of the cooling fan to the conditions prior to the first operation step after the end of the canceling step.

According to this method for controlling the projector, the luminance of the light source and the rotational speed of the cooling fan return to the original conditions when the predetermined operation different from the second ending operation is performed after the end of the first ending operation. Thus, even when the first ending operation is accidentally performed, the condition can be easily restored to the original one.

When the projector and the projector control method described above are constructed by using a computer included in the projector, the embodiments and application examples of the invention described above may be provided in the form of a program for providing the functions described above or a recording medium or the like which stores the program in such a manner that the program can be read by the computer. The recording medium for storing the program may be a flexible disk, a hard disk, an optical disk such as a CD and a DVD, a photo-electro-magnetic disk, a memory card and a USB memory including a non-volatile semiconductor memory, an internal memory device of the projector (semiconductor memory such as a RAM and a ROM), and other various types of medium from which the computer can read the program.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENT

A projector which forms an image corresponding to image information inputted from the outside (hereinafter referred to as "input image") by modulating light emitted from a light source and projects the image on a screen or the like is hereinafter described.

Figure 1:
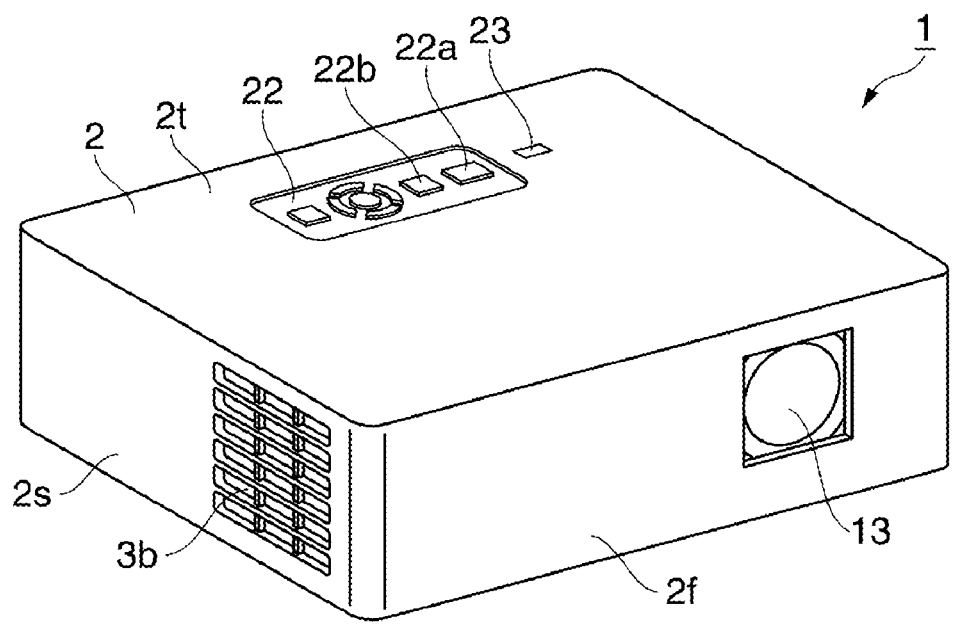
FIG. 1 is a perspective view of a projector, showing a front surface, an upper surface, and a right side surface of the projector.
Figure 2:
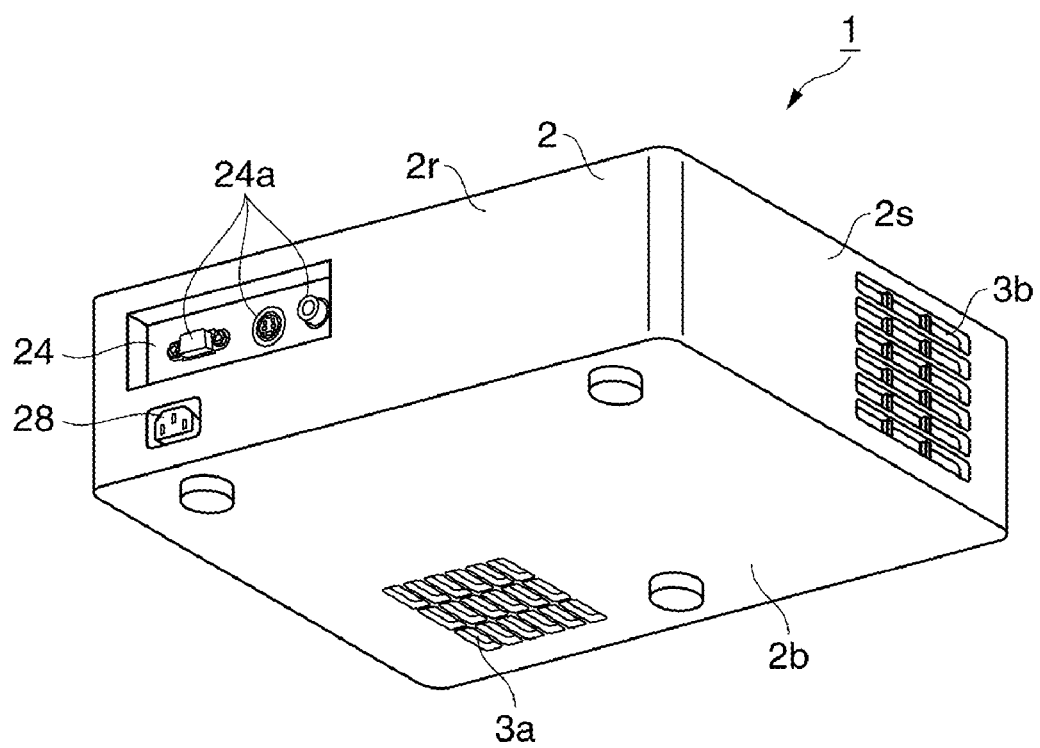
FIG. 2 is a perspective view of the projector, showing a back surface, a bottom surface, and the right side surface of the projector.

FIGS. 1 and 2 are perspective views of a projector according to this embodiment. FIG. 1 shows a front surface, an upper surface, and a right side surface of the projector. FIG. 2 shows a back surface, a bottom surface, and the right side surface of the projector.

As illustrated in FIGS. 1 and 2, a projector 1 has a device main body accommodated within a housing 2. A projection lens 13 for projecting an image is exposed through a front surface 2f of the housing 2. An input operation unit 22 through which a user issues various commands to the projector 1 is provided on an upper surface 2t of the housing 2. An LED notification unit 23 for notifying the operation condition of the projector 1 is disposed in the vicinity of the input operation unit 22. A power supply terminal 28 to which commercial power is supplied, and an image information input unit 24 to which image information is inputted from a not-shown external image output device are provided on a back surface 2r of the housing 2. The image information input unit 24 has a plurality of input pins 24a each of which connects with an end of a cable, with the other end of the cable connecting with the image output device.

The projector 1 includes a cooling fan 33 inside the housing 2 (see FIG. 3) to cool the interior of the housing 2 heated to high temperature by lighting of a light source or for other reasons. An intake port 3a through which air is introduced from the outside is formed on a bottom surface 2b of the housing 2. Air introduced through the intake port 3a by rotation of the cooling fan 33 cools the inside of the housing 2, and then is exhausted through an exhaust port 3b formed on a right side surface 2s of the housing 2.

Figure 3:
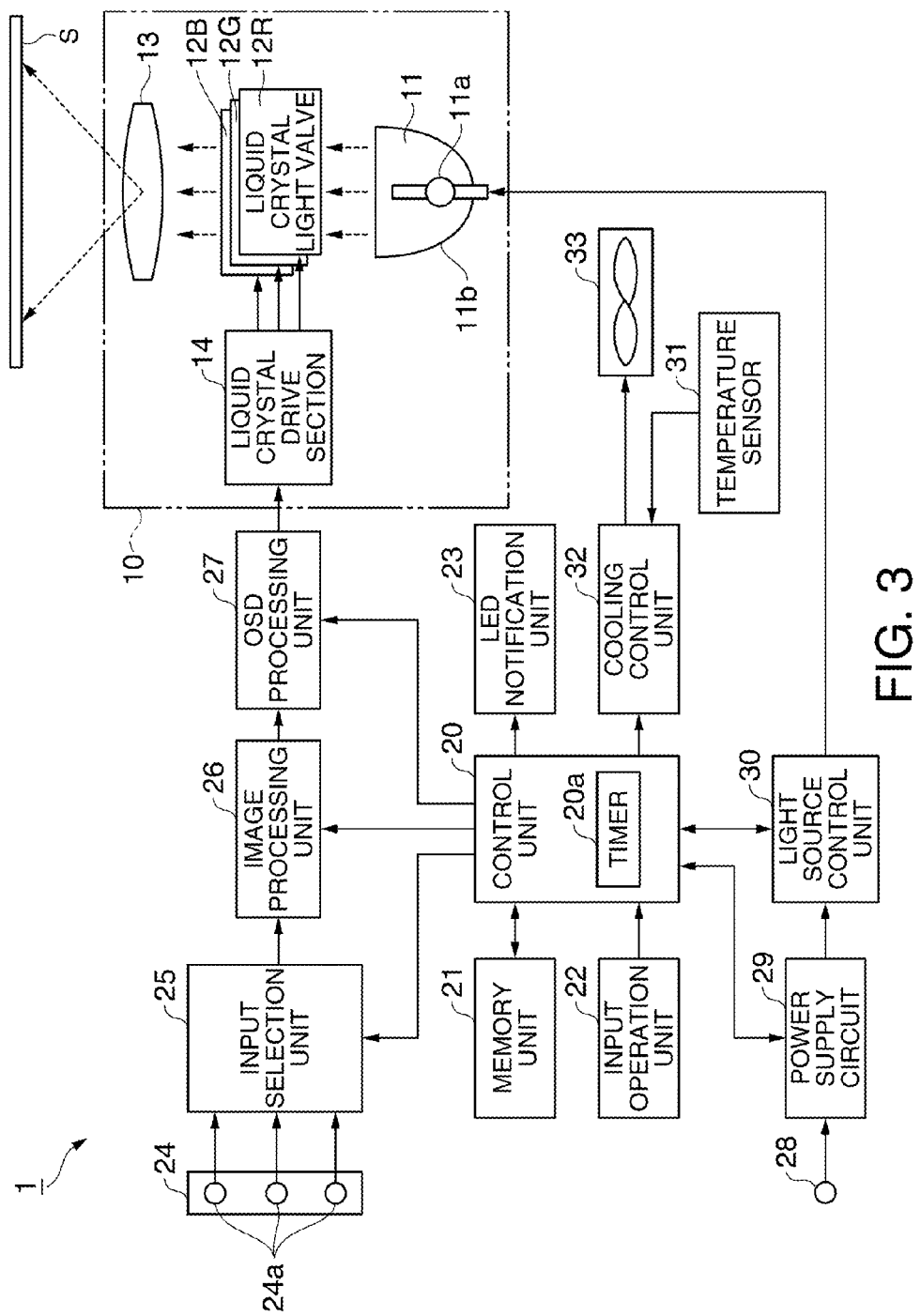
FIG. 3 is a block diagram showing a circuit structure of the projector.

FIG. 3 is a block diagram showing a circuit structure of the projector.

As shown in FIG. 3, the projector 1 includes an image projection unit 10, a control unit 20, a memory unit 21, the input operation unit 22, the LED notification unit 23, the image information input unit 24, an input selection unit 25, an image processing unit 26, an OSD processing unit 27, the power supply terminal 28, a power supply circuit 29, a light source control unit 30, a temperature sensor 31, a cooling control unit 32, the cooling fan 33, and other units, all of which are accommodated within the housing 2 (see FIGS. 1 and 2).

The image projection unit 10 contains a light source 11, three liquid crystal light valves 12R, 12G, and 12B as light modulation devices, the projection lens 13 as a projection system, a liquid crystal drive section 14, and others. The image projection unit 10 corresponds to a display unit which forms an image by modulating light emitted from the light source 11 using the liquid crystal light valves 12R, 12G, and 12B and projects the image through the projection lens 13 to display the image on a projection surface S.

The light source 11 contains a discharge-type light source lamp 11a constituted by an extra-high pressure mercury lamp, a metal halide lamp or the like, and a reflector 11b which reflects light emitted from the light source lamp 11a toward the liquid crystal light valves 12R, 12G, and 12B. The light emitted from the light source 11 is converted into light having substantially uniform luminance distribution by a not-shown integrator system, and separated into respective color light components in red (R), green (B), and blue (B) as three primary colors of light by a not-shown color separation system. The separated color lights enter the corresponding liquid crystal light valves 12R, 12G, and 12B.

Each of the liquid crystal light valves 12R, 12G, and 12B is constituted by a liquid crystal panel which contains liquid crystals sealed between a pair of transparent substrates, for example. Each of the liquid crystal light valves 12R, 12G, and 12B has a plurality of pixels arranged in matrix (not shown), allowing drive voltage to be applied to the liquid crystals by each pixel. When the liquid crystal drive section 14 applies drive voltage corresponding to inputted image information to the pixels, the light transmissivities of the respective pixels are set at values corresponding to the image information. Thus, the light emitted from the light source 11 is modulated while passing through the liquid crystal light valves 12R, 12G, and 12B, and an image for each color light is formed in accordance with the image information. The formed images in the respective colors are combined by a not-shown color combining system into a color image, and the color image is expanded and projected through the projection lens 13.

The control unit 20 has a CPU (central processing unit), a RAM (random access memory) used for temporarily storing various data and the like, and other sections to supervise and control the operation of the projector 1 under a control program stored in the memory unit 21. Thus, the control unit 20 functions as a computer in cooperation with the memory unit 21. The control unit 20 further has a timer 20a for measuring time.

The memory unit 21 has a non-volatile memory such as a mask ROM (read only memory), a flash memory, and an FeRAM (ferroelectric RAM). The memory unit 21 stores the control program for controlling the operation of the projector 1, various setting data for specifying the operation conditions and the like of the projector 1, and others.

The input operation unit 22 as a unit for receiving input operation from the user has a plurality of operation keys operated for issuing various commands from the user to the projector 1. The operation keys provided on the input operation unit 22 include a power source key 22a for switching between ON and OFF of a power source (see FIG. 1), an input switching key 22b for switching the effective input pin 24a (see FIG. 1), and other keys. When the user operates (presses) the various operation keys of the input operation unit 22, the input operation unit 22 receives this input operation and outputs an operation signal corresponding to the operation requested by the user to the control unit 20. The input operation unit 22 may be a unit including a remote controller capable of performing remote operation (not shown). In this case, the remote controller transmits an infrared operation signal corresponding to the operation requested by the user, and a not-shown signal receiving unit of the remote controller receives this operation signal and transmits the signal to the control unit 20.

The LED notification unit 23 is an indicator including an LED (light emitting diode) which notifies the user about the operation condition (ON/OFF of power source, abnormal condition or the like) of the projector 1 by switching the indication of the LED according to the command received from the control unit 20. The LED notification unit 23 can express a number of operational states by switching the state of the indication of the LED such as lighting, blinking, and non-lighting, or switching the emission light color.

The image information input unit 24 has the plural input pins 24a as discussed above, and image information is inputted to the input pins 24a from the external image output device such as a video reproduction device and a personal computer via the not-shown cable. The image information inputted to the respective input pins 24a is supplied to the input selection unit 25.

The input selection unit 25 selects one of the plural input pins 24a corresponding to the command received from the control unit 20, and outputs the image information inputted to the corresponding input pin 24a to the image processing unit 26. When the user operates the input switching key 22b provided on the input operation unit 22 to specify the desired input pin 24a, the control unit 20 allows the input selection unit to output the image information inputted to the corresponding input pin 24a to the image processing unit 26.

The image processing unit 26 converts the image information received from the input selection unit 25 into image information showing gradations of the respective pixels included in the liquid crystal light valves 12R, 12G, and 12B. The converted image information is provided for each color light of R, G, and B, and contains plural pixel values corresponding to all the pixels of the liquid crystal light valves 12R, 12G, and 12B. The pixel values determine the light transmissivities of the corresponding pixels to specify the intensities (gradations) of lights released from the respective pixels. The image processing unit 26 performs image quality control processing for adjusting brightness, contrast, sharpness, tint and the like or other processing for the converted image information, and outputs the processed image information to the OSD processing unit 27.

The OSD processing unit 27 performs processing for superimposing an OSD (on screen display) image such as a menu image and a message image on the input image in response to the command from the control unit 20. The OSD processing unit 27 has a not-shown OSD memory to store image data showing figures, fonts and the like for forming the OSD image. When the control unit 20 issues a command for superimposing the OSD image, the OSD processing unit 27 reads the necessary image data from the OSD memory and produces OSD image information for forming the specified OSD image. Then, the OSD processing unit 27 combines the OSD image information with the image information received from the image processing unit 26 such that the OSD image can be superimposed at a predetermined position of the input image. The image information combined with the OSD image information is outputted to the liquid crystal drive section 14. When the command for superimposing the OSD image is not issued from the control unit 20, the OSD processing unit 27 outputs the image information received from the image processing unit 26 to the liquid crystal drive section 14 without change.

The liquid crystal light valves 12R, 12G, and 12B operated by the liquid crystal drive section 14 according to the image information received from the OSD processing unit 27 form images corresponding to the image information to project these images through the projection lens 13.

The power supply circuit 29 receives commercial power supply of AC 100V or the like from the outside via the power supply terminal 28. The power supply circuit 29 converts the commercial power supply (alternating current power supply) into direct current power supply of predetermined voltage, and supplies power to the respective components of the projector 1 such as the light source control unit 30. In addition, the power supply circuit 29 switches between a condition for supplying power necessary for image projection (operation power) to the respective components (power source ON condition) and a condition for stopping the supply of the operation power and waiting for operation for turning on the power source (standby condition) in response to the command from the control unit 20.

The light source control unit 30 has an inverter (not shown) for converting direct current produced by the power supply circuit 29 into alternating rectangular-wave current, an igniter (not shown) for initiating startup of the light source lamp 11a by dielectric breakdown between electrodes of the light source lamp 11a, and other components to control lighting of the light source 11 in response to the command from the control unit 20. More specifically, the light source control unit 30 starts the light source 11 and supplies predetermined power thereto to turn on the light source 11, and also stops the supply of power to turn off the light source 11. Moreover, the light source control unit 30 controls power to be supplied to the light source 11 according to the command from the control unit 20 to adjust luminance (brightness) of the light source 11. In this embodiment, the luminance can be switched between two levels of "high luminance" for normal use and "low luminance" as luminance lower than "high luminance".

The temperature sensor 31 is constituted by a thermistor or the like which detects the temperature of the interior of the housing 2 and outputs the detection result to the cooling control unit 32. The temperature sensor 31 is disposed at a position generating heat or easily damaged by heat, for example the positions of the light source 11, the liquid crystal light valves 12R, 12G, and 12B, and the power supply circuit 29. Alternatively, the temperature sensor 31 may indirectly detect the temperature of the interior of the housing 2 by detecting the temperature of the air exhausted from the exhaust port 3b or by other methods instead of directly detecting the temperature of the interior of the housing 2.

The cooling control unit 32 controls start and stop of the rotation of the cooling fan 33 according to the command from the control unit 20, and also controls the number of revolutions (rotational speed) of the cooling fan 33 based on the command from the control unit 20 and the detection result from the temperature sensor 31. The cooling control unit 32 in this embodiment can switch between a plurality of levels of the rotational speed of the cooling fan 33. The cooling control unit 32 increases the rotational speed of the cooling fan 33 to reduce increase in temperature as the internal temperature of the housing 2 becomes higher, and decrease the rotational speed of the cooling fan 33 to reduce noise and power consumption caused by the rotation of the fan when the internal temperature is low.

The cooling fan 33 is constituted by an axial fan, a sirocco fan or the like. The cooling fan 33 rotates under the control of the cooling control unit 32 to introduce the outside air for cooling the inside of the housing 2 (particularly the image projection unit 10, the power supply circuit 29 and others) through the intake port 3a, and discharges the air having cooled the inside of the housing 2 through the exhaust port 3b. The cooling fan 33 may be a combination of plural fans. For example, the cooling fan 33 may include a fan disposed in the vicinity of the intake port 3a (intake fan) and a fan disposed in the vicinity of the exhaust port 3b (exhaust fan).

The operation of the projector 1 is now explained.

One end of the power source cable (not shown) is connected to the power supply terminal 28, and a power source plug provided at the other end of the power source cable is inserted into a wall socket. As a result, commercial power is supplied to the power supply circuit 29. The power supply circuit 29 having received the commercial power supply provides power (standby power) at least to the control unit 20, the memory unit 21, the input operation unit 22, and the LED notification unit 23, and the control unit 20 having received the power supply initiates operation according to the control program. The projector 1 comes into the standby condition (referred to as "power source OFF condition" as well) immediately after the commercial power supply is supplied. In this condition, the control unit 20 allows the LED notification unit 23 to light up in orange color, and monitors input operation to be given through the power source key 22a of the input operation unit 22. When the power source key 22a is operated by the user, the control unit 20 allows the power supply circuit 29 to initiate supply of operation power to the respective components and shifts the projector 1 to the power source ON condition.

When the projector 1 comes into the power source ON condition, the control unit 20 allows the LED notification unit 23 to light up in green color. Then, the control unit 20 allows the cooling control unit 32 to start the cooling fan 33 and control the rotational speed of the cooling fan 33 based on the detection result from the temperature sensor 31. The control unit 20 further allows the light source control unit 30 to turn on the light source 11. As a result, an image corresponding to the image information inputted to the input pin 24a is projected from the image projection unit 10.

When the power source key 22a is operated by the user under the power source ON condition, the control unit 20 allows the light source control unit 30 to turn off the light source 11 and shifts the projector 1 to the standby condition. In this specification, the operation of the power source key 22a under the standby condition, that is, the condition for shifting the projector 1 to the power source ON condition and turning on the light source 11 is referred to as "ON operation", and the operation of the power source key 22a under the power source ON condition, that is, the condition for turning off the light source 11 and shifting the projector 1 to the standby condition is referred to as "OFF operation".

In a structure in which the power source 11 is turned off by only one operation of the power source key 22a for shifting to the OFF operation, the light source 11 is turned off even when the user accidentally operates the power source key 22a. Since the light source 11 (particularly the discharge-type light source lamp 11a) is difficult to be again turned on promptly, the user is kept waiting for a long period until images are again displayed even when the ON operation is executed immediately after the accidental turning off of the light source 11. For overcoming this problem, a confirmation message is projected when the power source key 22a is operated under the power source ON condition in this embodiment. In this case, the light source 11 is turned off to shift the projector 1 to the standby condition only when the power source key 22a is again operated with the confirmation message projected. Thus, the OFF operation in this embodiment is equivalent to operating the power source key 22a twice in the power source ON condition.

Figure 4:
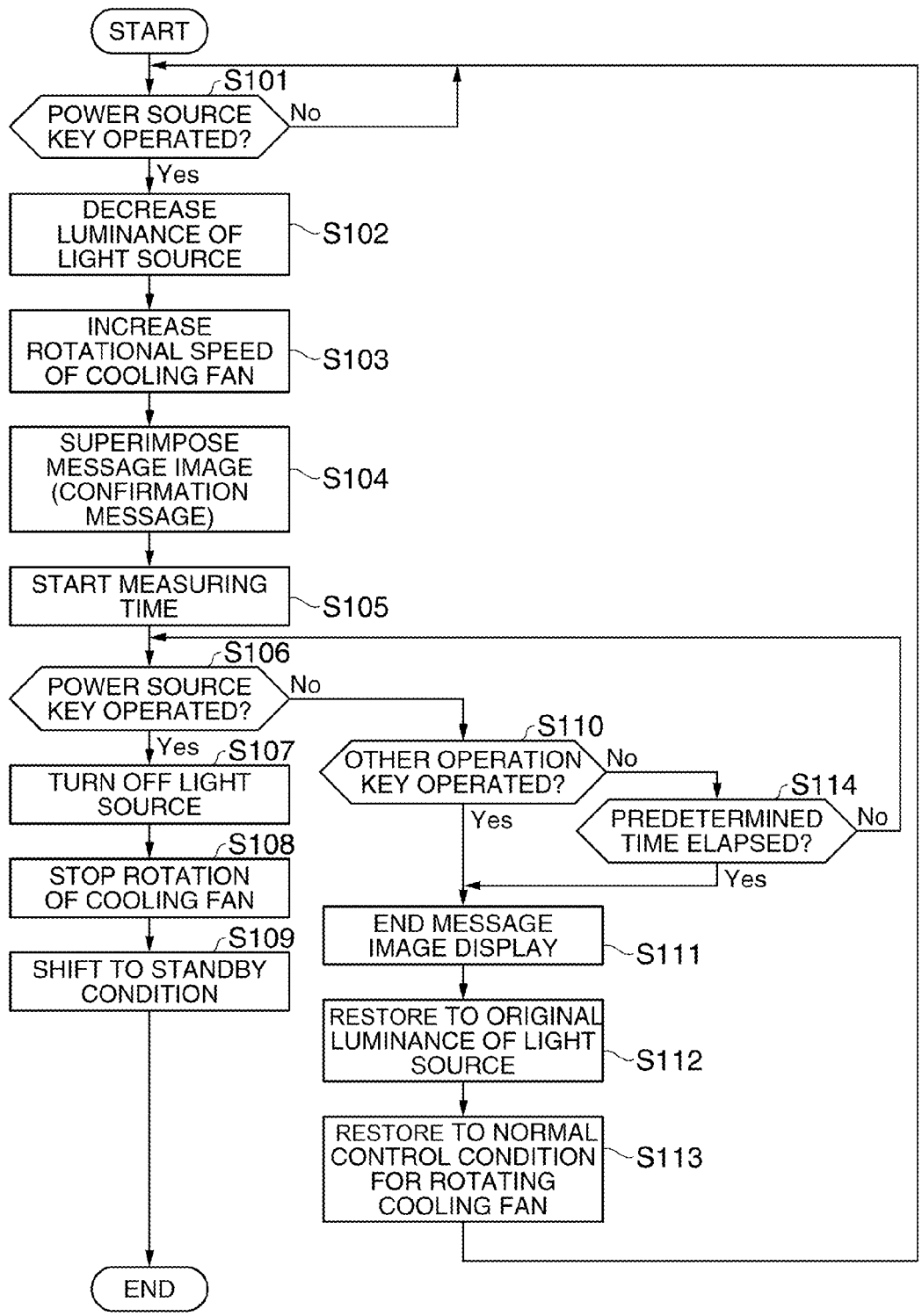
FIG. 4 is a flowchart showing operation of the projector during OFF operation.

FIG. 4 is a flowchart showing the operation of the projector 1 during the OFF operation, showing processes for shifting from the power source ON condition to the standby condition in response to the OFF operation.

As shown in FIG. 4, the control unit 20 determines whether the power source key 22a has been operated (first operation) in a step S101. When it is determined that the power source key 22a has not been operated, this step is repeated. When it is determined that the power source key 22a has been operated, the process goes to a step S102.

When the process proceeds to the step S102 after the operation of the power source key 22a, the control unit 20 allows the light source control unit 30 to decrease the level of luminance of the light source 11 to the lower luminance level. In the subsequent step S103, the control unit 20 allows the cooling control unit 32 to increase the rotational speed of the cooling fan 33 regardless of the detection result from the temperature sensor 31. More specifically, the control unit 20 rotates the cooling fan 33 at the maximum rotational speed in the plural speed levels.

Figure 5:
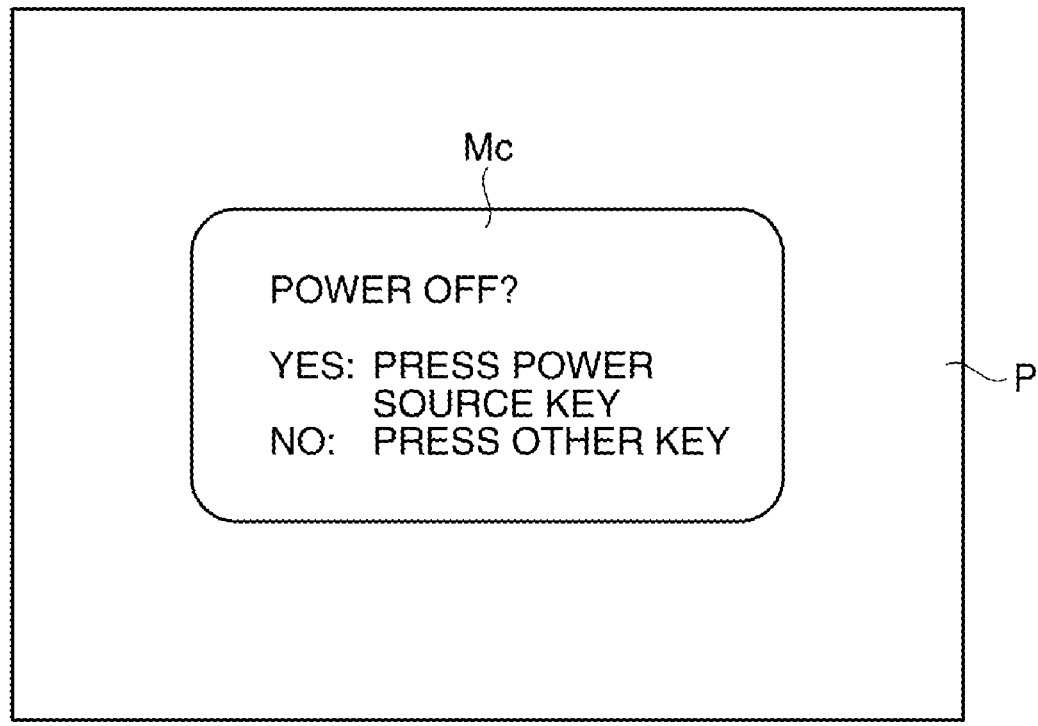
FIG. 5 illustrates a projection image on which a message image is superimposed.

In a step S104, the control unit 20 allows the OSD processing unit 27 to superimpose a message image Mc for confirming the shift to the standby condition (see FIG. 5) on an input image P. As illustrated in FIG. 5, the message image Mc contains a confirmation message for confirming whether to shift to the standby condition, that is, to turn off the power source ("POWER OFF?"), and also contains responses to the confirmation message (pressing the power source key 22a when "YES", and pressing another operation key when "NO"). Thus, the message image Mc urges the user to operate the power source key 22a or other operation keys.

In a step S105, the control unit 20 starts measuring time by using the timer 20a to measure the elapsed time after the display of the message image Mc.

In a step S106, the control unit 20 determines whether the power source key 22a has been operated (second operation) as a response to the confirmation message. When it is determined that the power source key 22a has been operated, the process goes to a step S107. When it is determined that the power source key 22a has not been operated, the process goes to a step S110.

When the process proceeds to the step S107 after the second operation of the power source key 22a, the control unit 20 allows the light source control unit 30 to turn off the light source 11. In the subsequent step S108, the control unit 20 allows the cooling control unit 32 to stop the rotation of the cooling fan 33.

In a step S109, the control unit 20 performs other necessary ending processes (not shown) such as allowing the LED notification unit 23 to light up in orange color, and then allows the power supply circuit 29 to stop the supply of the operation power and shifts the projector 1 to the standby condition as the end of the flow.

When the flow proceeds to the step S110 based on the determination that the second operation of the power source key 22a has not been performed in the step S106, the control unit 20 determines whether an operation key other than the power source key 22a has been operated. When it is determined that another operation key has been operated, the process goes to a step S111. When it is determined that no operation key has been operated, the process goes to a step S114.

When the flow proceeds to the step S111 based on the determination that the operation key other than the power source key 22a has been operated, the control unit 20 allows the OSD processing unit 27 to end the display of the superimposed message image Mc. In a step S112, the control unit 20 allows the light source control unit 30 to restore the luminance of the light source 11 to the luminance prior to reception of the first operation of the power source key 22a. In the subsequent step S113, the control unit 20 allows the cooling control unit 32 to return to the normal control condition for rotating the cooling fan 33 at a rotational speed corresponding to the detection result from the temperature sensor 31, and returns to the step S101. That is, the control unit 20 restores the luminance of the light source 11 and the rotational speed of the cooling fan 33 to the conditions prior to reception of the first operation of the power source key 22a. As a result, the OFF operation is canceled, and projection of the input image is restarted.

When the process proceeds to the step S114 based on the determination that any key other than the power source key 22a has not been operated in the step S110, the control unit 20 determines whether the predetermined time has elapsed after display of the message image Mc based on the time measurement result from the timer 20a. When it is determined that the predetermined time has not elapsed, the process returns to the step S106. When it is determined that the predetermined time has elapsed, the process proceeds to the step S111 to cancel the OFF operation and restart projection of the input image.

Accordingly, the projector 1 in this embodiment provides the following advantages.

(1) The projector 1 according to this embodiment decreases the luminance of the light source 11 and increases the rotational speed of the cooling fan 33 during the period from reception of the first operation of the power source key 22a to reception of the second operation of the power source key 22a. In this case, the temperature of the projector 1 lowers as the second operation of the power source key 22a is delayed longer. Thus, the user who desires to cool the projector 1 sufficiently may perform the second operation of the power source key 22a after elapse of a time from the first operation of the power source key 22a. On the other hand, the user who desires to put away the projector 1 promptly may perform the second operation of the power source key 22a immediately after the first operation of the power source key 22a. Accordingly, the cooling period can be established in accordance with the convenience or other conditions of the user for ending the use of the projector 1, which improves the usability of the projector 1.

(2) According to the projector 1 in this embodiment, the OSD processing unit 27 superimposes the message image Mc after the first operation of the power source key 22a to urge the user to perform the subsequent operation. Thus, even a user not familiar with the operation method can easily carry out the operation for ending the projector 1.

(3) The projector 1 in this embodiment restores the luminance of the light source 11 and the rotational speed of the cooling fan 33 to the original conditions when an operation key other than the power source key 22a is operated after the first operation of the power source key 22a. Thus, even when the power source key 22a is accidentally operated, this operation can be easily canceled.

According to this embodiment, the first operation of the power source key 22a corresponds to a first ending operation, and the second operation of the power source key 22a corresponds to a second ending operation. The OSD processing unit 27 displaying the message image Mc corresponds to a guide unit. The step S101 corresponds to a first operation step. The step S106 corresponds to a second operation step. The steps S107 and S108 correspond to an ending step. The steps S102 and S103 correspond to a cooling step. The step S104 corresponds to a guiding step. The step S110 corresponds to a canceling step. The steps S112 and S113 correspond to a restoring step.

Modified Example

This embodiment can be modified in the following manners.

According to this embodiment, the projector 1 shifts to the standby condition by operating the power source key 22a again after the operation of the power source key 22a in the power source ON condition. However, these two operations are not required to be the operations of the same operation key (the power source key 22a). The projector 1 may shift to the standby condition when a predetermined operation key other than the power source key 22a is operated after the operation of the power source key 22a.

According to this embodiment, both changes for decreasing the luminance of the light source 11 and increasing the rotational speed of the cooling fan 33 are effected after the first operation of the power source key 22a. However, only either one of these changes may be made.

In this embodiment, the message image Mc is projected in the low luminance condition of the light source 11. In this case, there is a possibility that the message image Mc has low visual recognizability. It is thus preferable that the contrast between the message (characters) and the background on the message image Mc is higher than that contrast on other OSD images projected under the high luminance condition.

While the three-plate-type projector 1 including the three liquid crystal light valves 12R, 12G, and 12B as light modulation devices has been discussed in this embodiment, the invention is applicable to a structure which forms an image by using a single liquid crystal light valve having pixels each of which contains sub pixels for transmitting R light, G light, and B lights, for example.

While the transmission-type liquid crystal light valves 12R, 12G, and 12B are used as light modulation devices in this embodiment, reflection-type light modulation devices such as reflection-type liquid crystal light valves may be employed. In addition, a micromirror array device which modulates light emitted from a light source by controlling the emission direction of entering light for each micromirror as pixel may be used, for example.

While the light source 11 is constituted by the discharge-type light source lamp 11a in this embodiment, the invention is applicable to a structure which includes a solid light source such as an LED (light emitting diode) light source or other light sources.

What is claimed is:

1. A projector comprising:
    an image projection unit which modulates light emitted from a light source and projects the modulated light;
    a cooling fan which cools the image projection unit;
    a light source control unit which controls lighting of the light source;
    a cooling control unit which controls operation of the cooling fan;
    an input operation unit which receives input operation; and
    a control unit which allows the light source control unit to turn off the light source and allows the cooling control unit to stop rotation of the cooling fan in case that the input operation unit receives a first ending operation to stop projection and a second ending operation performed subsequently to the first ending operation,
    wherein the control unit performs allowing the light source control unit to decrease the luminance of the light source or allowing the cooling control unit to increase the rotational speed of the cooling fan during the period from the time when the input operation unit receives the first ending operation to the time when the input operation unit receives the second ending operation.

2. The projector according to claim 1, further comprising a guide unit which shows guidance for performing the second ending operation after the input operation unit receives the first ending operation.

3. The projector according to claim 1, wherein the control unit restores the luminance of the light source and the rotational speed of the cooling fan to the conditions prior to the reception of the first ending operation in case that the input operation unit receives predetermined operation different from the second ending operation after reception of the first ending operation.

4. A method for controlling a projector which includes an image projection unit modulating light emitted from a light source and projecting the modulated light, a cooling fan cooling the image projection unit, and an input operation unit receiving input operation, comprising the steps of:
    a first operation step which allows the input operation unit to receive a first ending operation to stop projection;
    a second operation step which allows the input operation unit to receive a second ending operation performed subsequently to the first ending operation after the end of the first operation step;
    an ending step for turning off the light source and stopping rotation of the cooling fan after the second operation step; and
    a cooling step for performing decreasing the luminance of the light source or increasing the rotational speed of the cooling fan during the period after the end of the first operation step and before the start of the second operation step.

5. The method for controlling the projector according to claim 4, further comprising:
    a guiding step for showing guidance for performing the second ending operation after the end of the first operation step.

6. The method for controlling the projector according to claim 4, further comprising:
    a canceling step for receiving predetermined operation different from the second ending operation after the end of the first operation step; and
    a restoring step for restoring the luminance of the light source and the rotational speed of the cooling fan to the conditions prior to the first operation step after the end of the canceling step.

* * * * *